(12) United States Patent
Ananda

(10) Patent No.: US 7,359,869 B1
(45) Date of Patent: Apr. 15, 2008

(54) METHOD AND SYSTEM FOR FACILITATING SECURE ELECTRONIC TRANSACTIONS WITH MULTIPLE MERCHANTS

(75) Inventor: Mohan Ananda, Westlake Village, CA (US)

(73) Assignee: Stamps.Com, Inc., Los Angeles, CA (US)

( * ) Notice: Subject to any disclaimer, the term of this patent is extended or adjusted under 35 U.S.C. 154(b) by 202 days.

(21) Appl. No.: 09/616,714

(22) Filed: Jul. 14, 2000

(51) Int. Cl.
*G06Q 30/00* (2006.01)
*G06F 17/30* (2006.01)

(52) U.S. Cl. .......................................... 705/26; 705/27
(58) Field of Classification Search .................. 705/25, 705/26–27
See application file for complete search history.

(56) References Cited

U.S. PATENT DOCUMENTS

| | | | |
|---|---|---|---|
| 4,799,156 A | 1/1989 | Shavit et al. | |
| 4,831,555 A | 5/1989 | Sansone et al. | |
| 4,900,903 A | 2/1990 | Wright et al. | |
| 4,900,904 A | 2/1990 | Wright et al. | |
| 4,908,770 A | 3/1990 | Breault et al. | |
| 4,992,940 A | 2/1991 | Dworkin | |
| 5,111,030 A | 5/1992 | Brasington et al. | |
| 5,454,038 A | 9/1995 | Cordery et al. | |
| 5,495,411 A | 2/1996 | Ananda | |
| 5,548,645 A | 8/1996 | Ananda | |
| 5,671,279 A | 9/1997 | Elgamal | |
| 5,692,132 A | 11/1997 | Hogan | |
| 5,715,314 A | 2/1998 | Payne et al. | |
| 5,724,424 A | 3/1998 | Gifford | |
| 5,732,400 A | 3/1998 | Mandler et al. | |
| 5,745,681 A | 4/1998 | Levine et al. | |
| 5,757,917 A | 5/1998 | Rose et al. | |
| 5,758,327 A | 5/1998 | Gardner et al. | |
| 5,758,328 A | 5/1998 | Giovannoli | |
| 5,794,207 A | 8/1998 | Walker et al. | |
| 5,809,144 A | 9/1998 | Sirbu et al. | |
| 5,822,737 A | 10/1998 | Ogram | |
| 5,825,881 A | 10/1998 | Colvin, Sr. | |
| 5,826,241 A | 10/1998 | Stein et al. | |
| 5,842,178 A | 11/1998 | Giovannoli | |
| 5,850,442 A | 12/1998 | Muftic | |
| 5,850,446 A | 12/1998 | Berger et al. | |
| 5,966,697 A * | 10/1999 | Fergerson et al. | .......... 235/375 |

(Continued)

OTHER PUBLICATIONS

Massachusetts Institute of Technology, "*MIT Distribution Site for PGP (Pretty Good Privacy),*" {http://web.mit.edu/network/pgp.html} (visited Nov. 21, 2000).

(Continued)

*Primary Examiner*—Matthew S. Gart
(74) *Attorney, Agent, or Firm*—The Hecker Law Group, PLC

(57) ABSTRACT

A system for conducting electronic commerce comprising at least one client computer system, a vendor computer system and a merchant computer system, interconnected via the communication link. The client computer and the vendor computer system are configured to establishing a secure link communication between the client computer system and the vendor computer system and transmit transaction information between the client and vendor computer systems enabling a user at the client computer system to select and purchase, via the vendor computer system, items listed in at least the merchant computer systems by one or more merchants.

18 Claims, 8 Drawing Sheets

U.S. PATENT DOCUMENTS 6,141,666 A * 10/2000 Tobin .......................... 715/513
6,263,317 B1 * 7/2001 Sharp et al. ................... 705/26
6,535,880 B1 * 3/2003 Musgrove et al. ............ 707/10
6,587,827 B1 * 7/2003 Hennig et al. ................. 705/1
6,587,838 B1 * 7/2003 Esposito et al. .............. 705/26
2001/0010046 A1 * 7/2001 Muyres et al. ................ 705/52

OTHER PUBLICATIONS

Network Associates, Inc., "*PGP Security, PGP Freeware, PGP Personal Privacy*" {http://www.pgp.com/products/freeware/default.asp} (visited Nov. 21, 2000).

* cited by examiner

METHOD AND SYSTEM FOR FACILITATING SECURE ELECTRONIC TRANSACTIONS WITH MULTIPLE MERCHANTS

BACKGROUND OF THE INVENTION

1. Field of the Invention

The present invention relates to user shopping for goods and services across a network, such as the Internet.

2. Background Art

Communication networks such as the Internet provide an unprecedented channel for commerce. Internet based network systems such as the World Wide Web ("Web") are configured as a logical construct comprising interconnected routers and computers (e.g., servers), wherein the routers direct packets of information from source computers to destination computers over an underlying transmission network. Because of its expanse and accessibility, the Web is increasingly utilized as a means of commerce for items (e.g., goods and services) listed in databases on web-servers world wide. In many Web applications, lists of items for purchase are collected on web-servers for access and viewing by end-users computer systems. A user typically utilizes a personal computer or a terminal to establish a connection with Web-servers of several merchants through the Internet, searches the Web-servers for listed items, and transacts business with the merchants by electing to purchase desired items on-line and arranging for payment. The purchased items are then sent to the user by the merchants via delivery methods such as mail.

However, the above process is inefficient and complicated as a user wishing to purchase items listed by different merchants has to navigate from one merchant server to another merchant server to select items for purchase and arrange for delivery. Another disadvantage is that user has to arrange for payments, and make payments to, multiple merchants. In some instances, the user is required to send different checks to the different merchants for the amounts due before the merchants send the purchased items to the user. This is time consuming as the user has to write multiple checks. And, paper-based checking systems are burdensome, inconvenient, costly and time consuming for both users and financial institutions. Further, frequently the user has to wait until the merchants cash the checks before the purchased items are shipped, adding to the inherent delays associated with processing checks. To alleviate these problems, some conventional systems utilize electronic checks or funds transfer by a process of value exchange through banks' computer transactions. However, such electronic payment methods are limited because they cannot be performed without the banking system, and typically cannot be performed during off business hours.

As a result of the difficulties associated with users typically resort to credit cards as a means of electronic funds transfer for purchasing items over the Internet. However, many users with credit cards are concerned about providing their credit card and personal information over the Internet for shopping. And, the credit card information has to be transmitted to multiple merchants from whom a user wishes to purchase items.

SUMMARY OF THE INVENTION

The present invention alleviates the above problems. In one embodiment, the present invention provides a method and system for secure electronic commerce transactions with multiple merchants through a vendor using a single integrated payment procedure.

A network system includes at least one client computer system, a vendor computer system, and merchant computer systems, interconnected via a communication link. In one example, the present invention enables a user to conduct electronic commerce by initiating a secure communication session between the client computer system and the vendor computer system. Once the secure communication session is established the user transmits transaction information between the client and vendor computer systems enabling the user, residing at the client computer system, to select and purchase, via the vendor computer system, items listed in at least the merchant computer systems by one or more merchants.

After the user's selection of one or more items for purchase from one or more merchant computer systems via the primary server computer, a purchase order is generated for the selected items to be supplied to the user by one or more merchants. The vendor operator of the vendor computer system may make payments to one or more merchants for the supplied items. The user may make payments to said vendor for the supplied items.

As a result, such, the user submits the various purchase orders to different merchants, and makes only a single payment to the vendor. The vendor settles payments with the various merchants on behalf of the user.

BRIEF DESCRIPTION OF THE DRAWINGS

These and other features, aspects and advantages of the present invention may be better understood with regard to the following description, appended claims and accompanying drawings where:

DETAILED DESCRIPTION OF THE INVENTION

Figure 1:
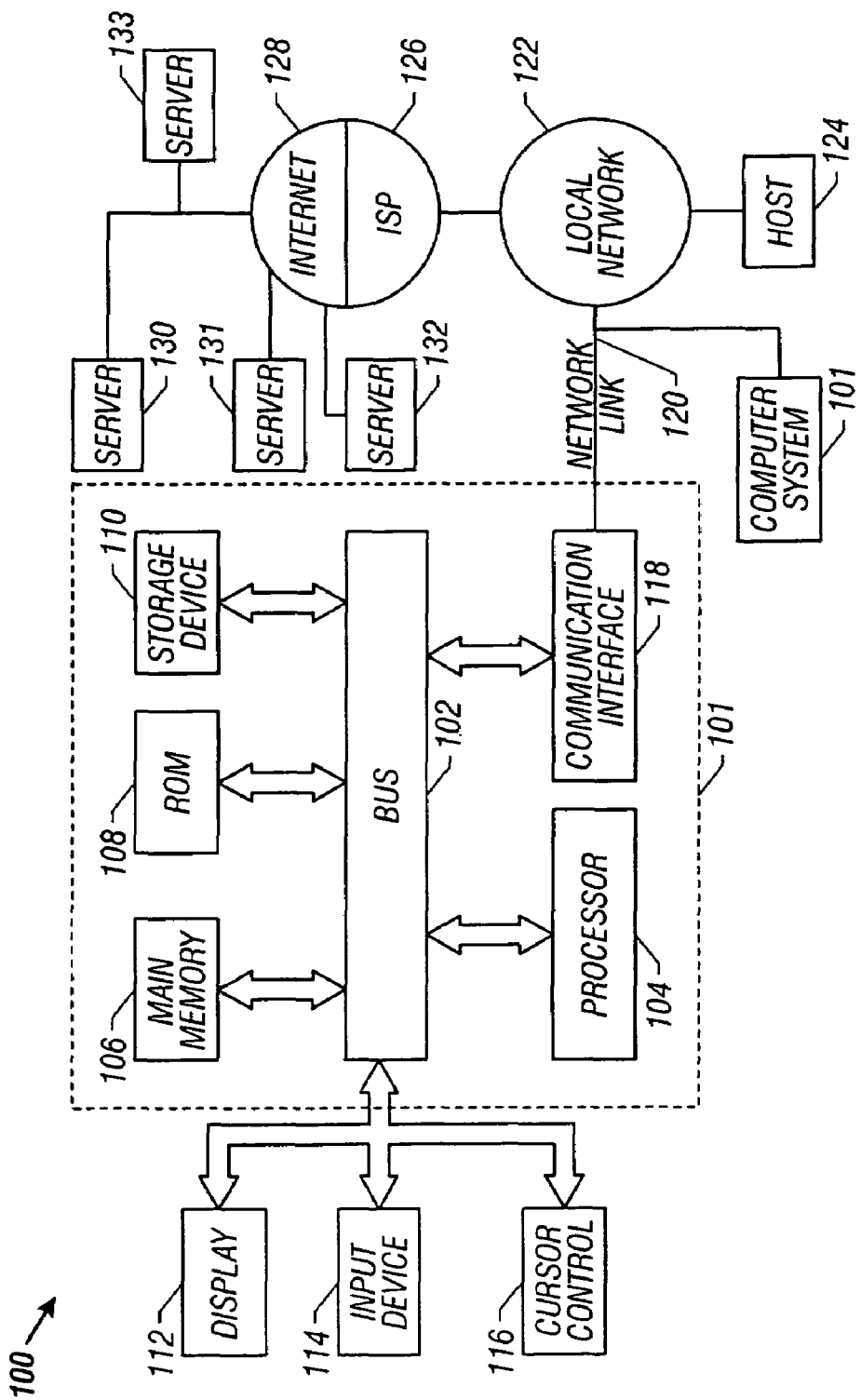
FIG. 1 illustrates block diagram of an embodiment of the invention utilizing a network system in which the present invention can be implemented.

FIG. 1 illustrates a block diagram of an example architecture of an embodiment of a computer system 100 in which the present invention can be implemented. The computer system 100 comprises computer system 101 connected to server computing systems 130, 131. A computer system 101 comprises a bus 102 or other communication mechanism for communicating information, and a processor (CPU) 104 coupled with the bus 102 for processing information. The computer system 101 also includes a main memory 106, such as a random access memory (RAM) or other dynamic storage device, coupled to the bus 102 for storing information add instructions to be executed by the processor 104. The main memory 106 also may be used for storing temporary variables or other intermediate information during execution or instructions to be executed by the processor 104. The computer system 101 further comprises a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 may also contain, for example, a 32-bit data bus for transferring data between and among the components, such as the CPU 104, the main memory 106, video memory and the storage 110. Alternatively, multiplex data/address lines may be used instead of separate data and address lines.

In one embodiment, the CPU 104 comprises a microprocessor manufactured by Motorola®, such as the 680×0 processor or a microprocessor manufactured by Intel®, such as the 80×86, or Pentium® processor, or a SPARC® microprocessor from Sun Microsystems®. However, any other suitable microprocessor or microcomputer may be utilized. The main memory 106 can comprise dynamic random access memory (DRAM). And video memory (not shown) can comprise a dual-ported video random access memory.

The computer system 101 may be coupled via the bus 102 to a display 112, such as a cathode ray tube (CRT) or Liquid Crystal Display (LCD), for displaying information to a computer user. An input device 114, including alphanumeric and other keys, is coupled to the bus 102 for communicating information and command selections to the processor 104. Another type or user input device comprises cursor control 116, such as a mouse, a trackball, or cursor direction keys for communicating direction information and command selections to the processor 104 and for controlling cursor movement on the display 112. This input device typically has two degrees of freedom in two axes, a first axis (e.g., x) and a second axis (e.g., y) that allows the device to specify positions in a plane.

Each of the servers 130-133 comprising one or more computer systems such as the computer system 101. According to one embodiment of the invention, the processes of the present invention may be executed provided by computer systems 101 (e.g., within the servers 130) in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequence of instructions contained in the main memory 106. Hard-wired circuitry may also be used in place of or in combination with software instructions to implement one embodiment of the present invention. Thus, embodiments of the invention are not limited to any specific combination of hardware circuitry and software.

The term "computer-readable medium" as used herein refers to any medium that participated in providing instructions to the processor 104 for execution. Such a medium may non-volatile media, volatile media, and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the computer system 101 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The computer system 101 also includes a communication interface 118 coupled to bus 102. The communication interface 118 provides a two-way data communication coupling to a network link 120 that is connected to a local network 122. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card configured to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the world wide packet data communication network now commonly referred to as the "Internet" 128. The local network 122 and the Internet 128 both use electrical, electromagnetic or optical signals that carry digital data streams. The signals through the various networks and the signals on the network link 120 and through the communication interface 118, which carry the digital data to and from the computer system 101, are exemplary forms or carrier waves transporting the information.

The computer system 101 can send messages and receive data, including program code, through the network(s), the network link 120 and the communication interface 118. In the Internet example, servers 130-133 can transmit a requested code for an application program through the Internet 128, the ISP 126, the local network 122 and the communication interface 118.

The communication interface 118 can comprise a USB/Tuner and the network link 120 may be an antenna or cable for connecting the computer system 101 to a cable provider, satellite provider or other terrestrial transmission system for receiving messages, data and program code from another source.

The received code may be executed by the processor 104 as it is received, and/or stored in the storage device 110, or other non-volatile storage for later execution. In this manner, the computer systems 101 can obtain application code in the form of a carrier wave.

The example versions of the invention described herein are implemented as logical operations in a distributed processing system such as the network system 100 including client computing systems 101 and server computing systems 130, 131. The logical operations of the present invention can be implemented as a sequence of steps executing on the computing network 100, and as interconnected machine modules within the computing network 100. The implementation is a matter of choice and can depend on performance of the network 100 implementing the invention. As such, the logical operations constituting the example versions of the invention are referred to for e.g. as operations, steps or modules.

In one embodiment of the invention, the computer systems 101 comprise client computers capable of running graphical user interfaces such as browsers and a server system 130 comprises a vendor computer system (e.g., vendor web servers). Further the server systems 131 comprise merchant computer systems (e.g., merchant web servers). Conducting electronic commerce on the network system 100 according to one embodiment of the present invention comprises establishing a secure communication between the client computer system 101 and the vendor computer system 130 and transmitting transaction information between the client and vendor computer systems 101, 130. The secure communication link may be established using either asymmetric or symmetric encryption techniques such as RSA, DES, or any other encryption or hashing technique that is capable of providing a secure communication link. The system then enables a user at the client computer system 101 to select and purchase, via the vendor computer system 130, items listed in at least the merchant computer systems 131 by one or more merchants. Further the user can select and purchase items listed at the vendor computer system 130 by a vendor.

The system 100 provides a method for achieving secure electronic commerce transactions by a user/customer by utilizing the Internet or an Intranet communication network. The system 100 enables a user to conduct electronic commerce transactions via a primary vendor web site at a server 130 using a single integrated payment procedure, wherein the vendor web site can include a list of items comprising, for example, products and/or services offered for sale by the vendor. Further, the primary vender web site can provide the user, via the vendor web site at the server 130, access to multiple merchant web pages at servers 131, wherein the merchant web pages comprise a list of items offered for sale by the merchants.

Figure 2:
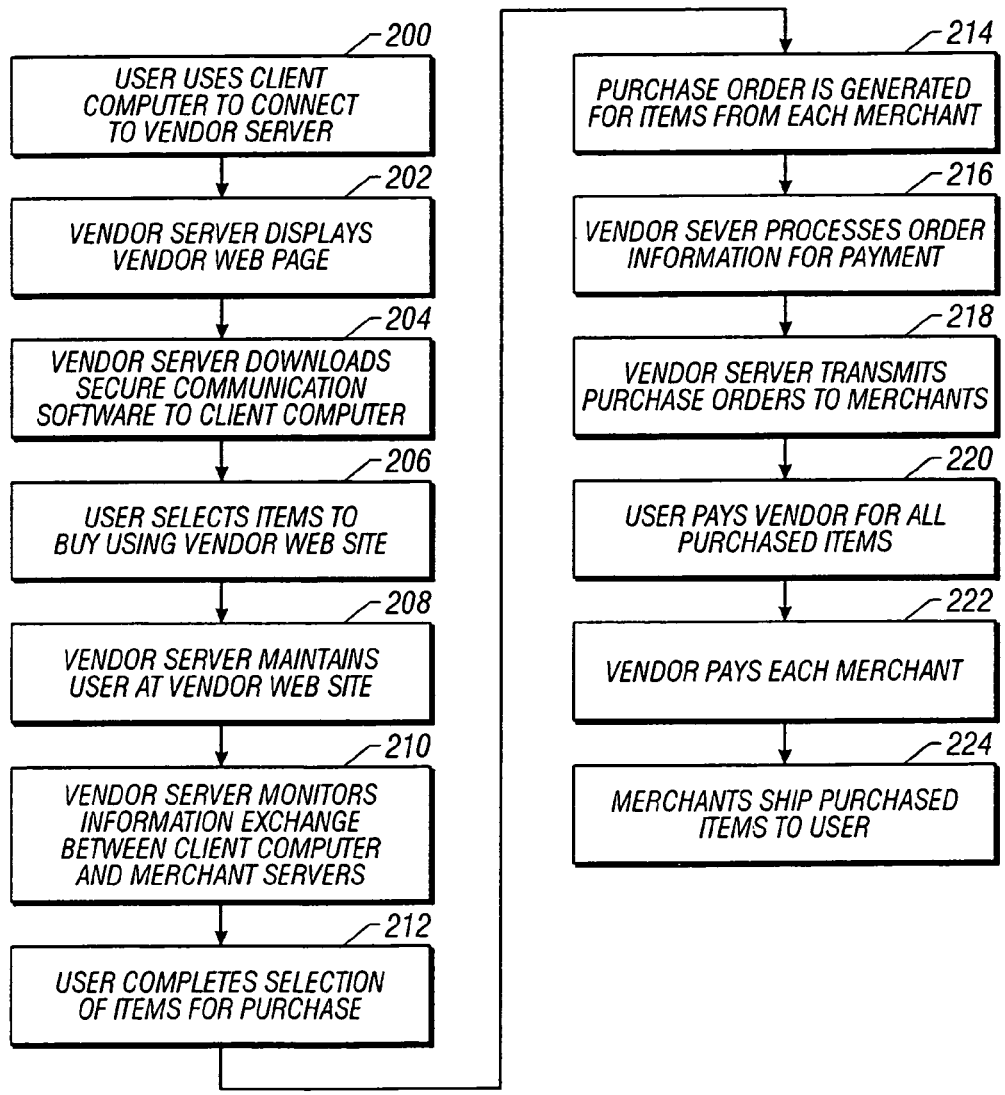
FIG. 2 illustrates an example flow diagram of an embodiment of the invention utilized to conduct electronic commerce.

FIG. 2 illustrates how one embodiment of the present invention conducts electronic commerce. The user utilizes a GUI such as a commercially available browser software at a client computer 101 to communicate with a vendor web server 130 (step 200), whereby a vendor web site home web page is displayed to the user on the client computer 101 (step 202). The user then downloads a secure communication software module (e.g., a plug-in) by clicking on an appropriate button displayed on the vendor's home page at the client computer 101, unless the user has already previously downloaded the secure communication software (step 204). The secure communication software allows the user to conduct secure electronic commerce transactions with the vendor using the vendor computer system 130 and to transmit credit card or other payment means information over the communication medium in the system 100 to the vendor computer system 130.

The user is now able to select items for purchase that are listed by the vendor in the vendor web site at the server 130, as well as items listed by merchants that have displayed their interface links on the vendor's website (step 206). An interface link may comprise a hyperlink, a command button, or any other embedded item that may transmit a command to the vendor server. When the user clicks on a specific merchant's interface button, the user is not directed to the merchant's web server 131 for direct interaction between the client computer 101 and the merchant web server 131. Instead, the user continues to utilize the vendor's home page (web site) at the vendor computer system 130, and the vendor's web server 130 utilizes a command processing engine to provide the merchant's home web page, as well as any other web pages, to the vendor's web site in the vendor computer system 130. Thus, the vendor's web server may obtain content from the merchant server that is then presented for display by the vendor server to the user at the browser in the client computer 101 (step 208). In one embodiment of the invention, the command processing engine uses one or more communication protocol(s) to establish a communication link between the vendor's web server and the merchant's web server. The merchant server comprises a merchant communication interface that is configured to respond to calls and/or requests for information from the command processing engine. For example, the command processing engine may initiate calls and/or request data from the merchant server in order to obtain information displayed on the merchant's web page or residing on the merchant server. Thus, in one embodiment of the invention the command processing engine may interfaces with one or more merchant servers via the merchant communication interface.

The merchant server may, for example, use an Application Program Interface (API) to offer the vendor server's command processing engine access to the merchant server's content. Thus the API, or any other mechanism capable of offering the vendor server access to services offered by the merchant server, may provide the vendor server with access to data residing on one or more merchant servers. The command processing engine sends calls to the communication interface to pass data between the merchant server(s) and the vendor server(s) and thereby provide the vendor server(s) with a list of features offered by the merchant server.

In one embodiment of the invention, the merchant server provides an interface (e.g., an API, SDK, daemon process, distributed objects, JINI™, etc. . . . ) that specifies what data and/or service(s) the vendor server may access. The vendor server is not typically allowed access to the merchant server until an authentication process is completed. However, if the vendor server and the merchant server belong to a trusted environment or if the merchant and/or vendor elect to offer certain types of data to all requesting parties, the merchant server may not require authentication.

The communication mechanism that resides on one or more of the merchant servers may be configured to provide the vendor server with access to a list of items and/or services offered by the merchant server. The vendor server may also be allowed to access payment information, order status (e.g., what item/service was sold, return status, delivery status), accounting information, inventory status, and/or any other data and/or services associated with the transactions that are to be performed. The merchant server does not require that all the data and/or services offered by the merchant server be offered to the vendor server via the communication interface. For example, the merchant server may elect to only offer the vendor server data associated with a particular item and/or type of transaction. One embodiment of the invention contemplates using the communication interface to provide the vendor server with access to any data that is related to or associated with any item or service that is being offered for sale by the vendor, but that is supplied by the merchant.

During the process described above the vendor's web server 130 can monitor the information traffic between the user and the merchant's web server 131 therethrough (step 210). After reviewing the web pages of the merchant and selecting listed items therein for purchase (step 212), a purchase order is generated for the selected items by web server 130, and the vendor web server 130 tracks and captures that purchase order (step 214). In one embodiment of the invention, no user credit card, or other payment, information is transferred to the merchants' web server 131, rather the vendor computer system 130 processes all the payment information (step 216).

Thereafter, the vendor computer system 130 transmits the user's purchase order to the merchant's web server (step 218). The user pays the vendor for the items (step 220), and the vendor pays each merchant for the items shipped to the user according to terms of an agreement between the vendor and each merchant (step 222). At step 224, the merchants ship the purchased items to the user. As such, the user submits the various purchase orders to different merchants, and makes only a single payment to the vendor and vendor settles payments with the various merchants. The vendor web server 130 stores transaction information including all the user information, purchase order information, merchant information and payment information in a database for subsequent audit purposes.

In one example embodiment of the invention, a vendor utilizes a vendor web site at a server 130 to list items for sale by the vendor. Further, the vendor utilizes a centralized web browser at the server 130 to allow users to make purchases in other merchant's web sites such as Amazon.com™, CD-Now™, etc on merchant servers 131, directly from the vendor's web site at the vendor computer system 130, thereby enabling the vendor to be a wholesaler of the merchants' products and services.

Referring to FIGS. 3-6, a sequence of example events and interactions with browsers 300 and web pages 302 on the client and server computers 101, 130, respectively, in the network 100 by a user for conducting electronic commerce according to an aspect of the present invention is provided.

For example, once a user visits a vendor's web site at a server 130 (e.g. http://www.stamps.com) to purchase items listed therein (e.g., postage), the vendor obtains the necessary information regarding the user in a database to provide online shopping from other merchant web sites on the server 131 on the Internet. The vendor's web site home page 302 can include icons 304 for different merchants such as Stamps.com™, or other Vendors™ etc., wherein a user who clicks on icons 304 may search, select and purchase any of the products sold by said merchants as though the user had directly navigated to the merchants' web sites on server 131 to buy the merchants' products/services. According to the present invention, throughout the transaction process the user never leaves the vendor's web site at the server 130 and thereby the vendor places orders for user selected products to the merchants selling those products, on behalf of the user, and the products are shipped directly to the user by the merchants. In one example, searching for products from a merchant via the server 130 is provided by merchant's search capabilities on the merchant server 131.

Figure 3:
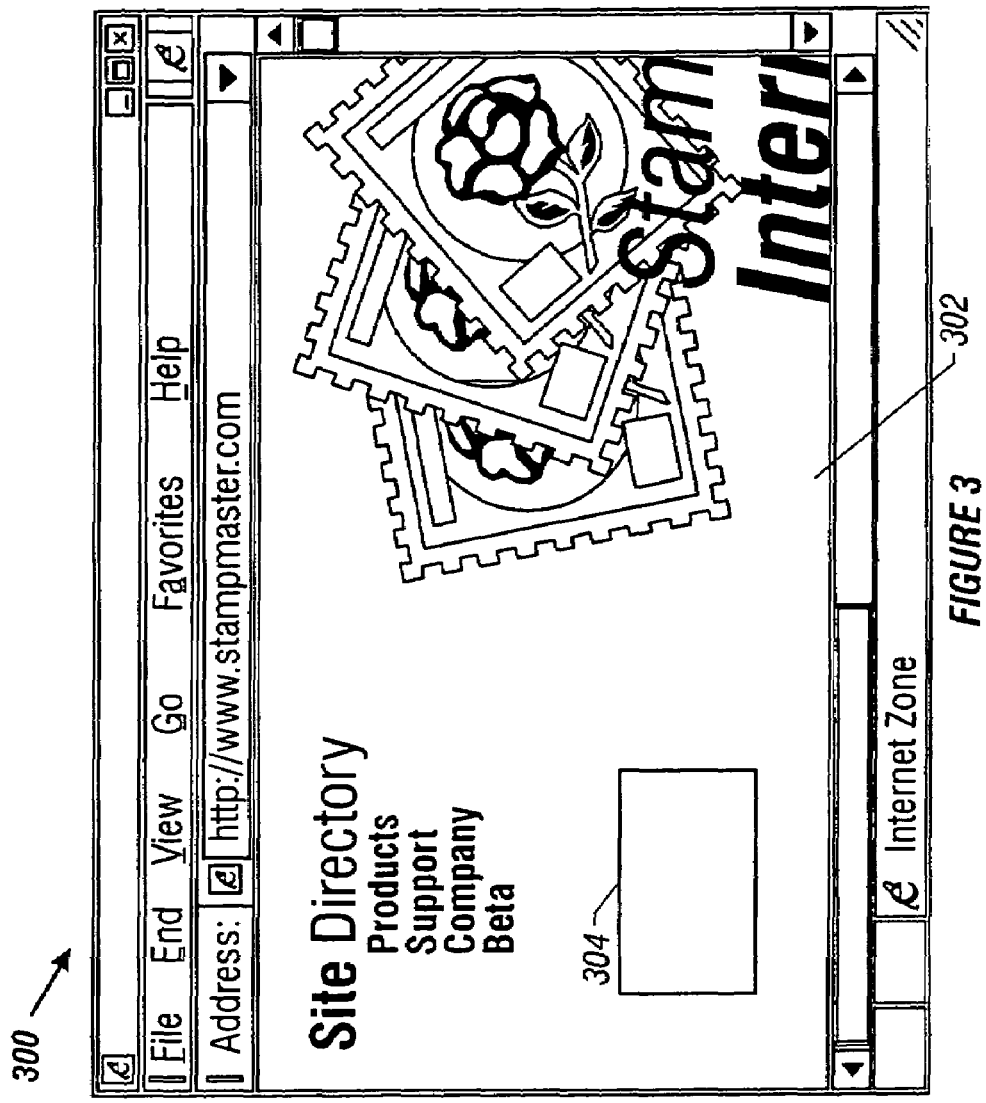
FIGS. 3-6, show example GUIs and user interaction with a client and server computer.
Figure 4:
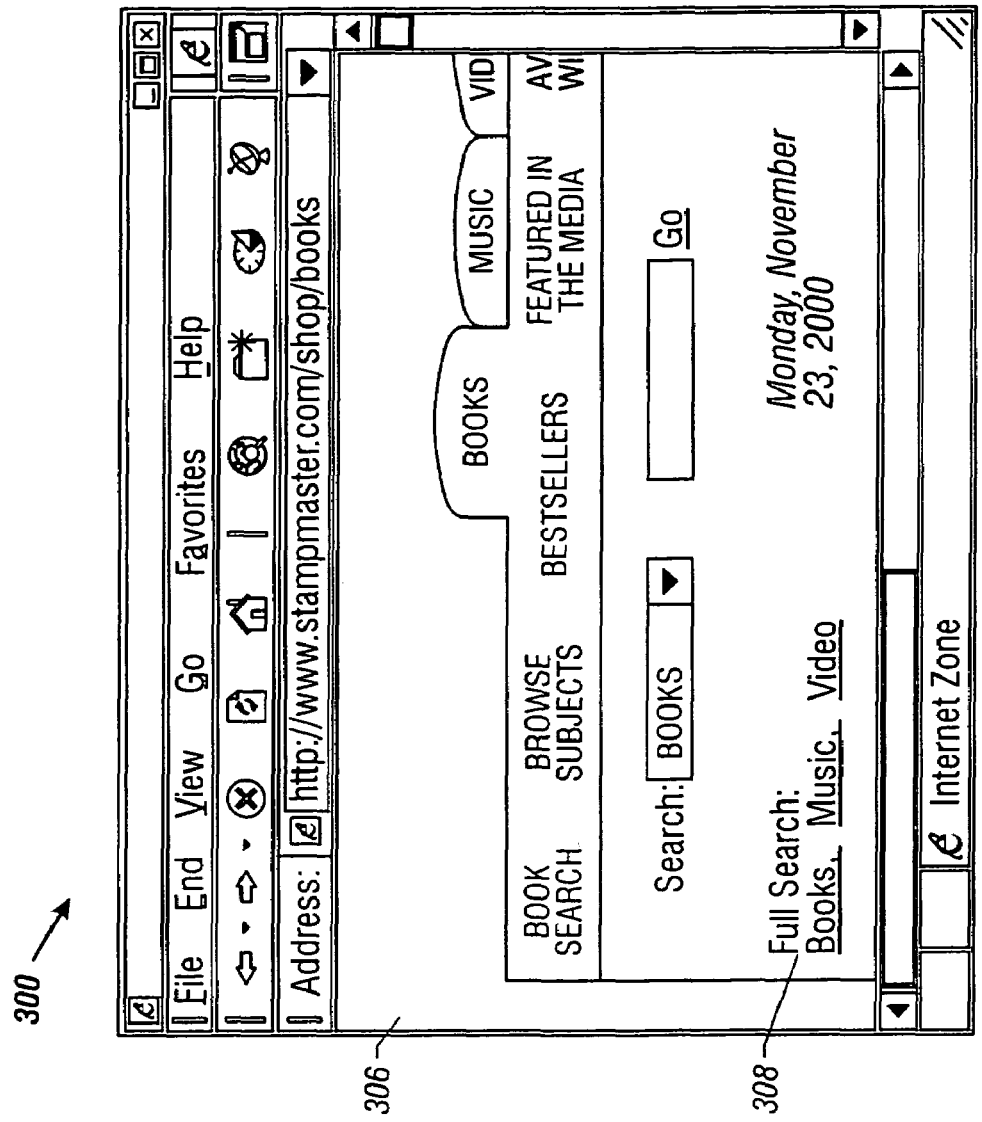
Figure 5:
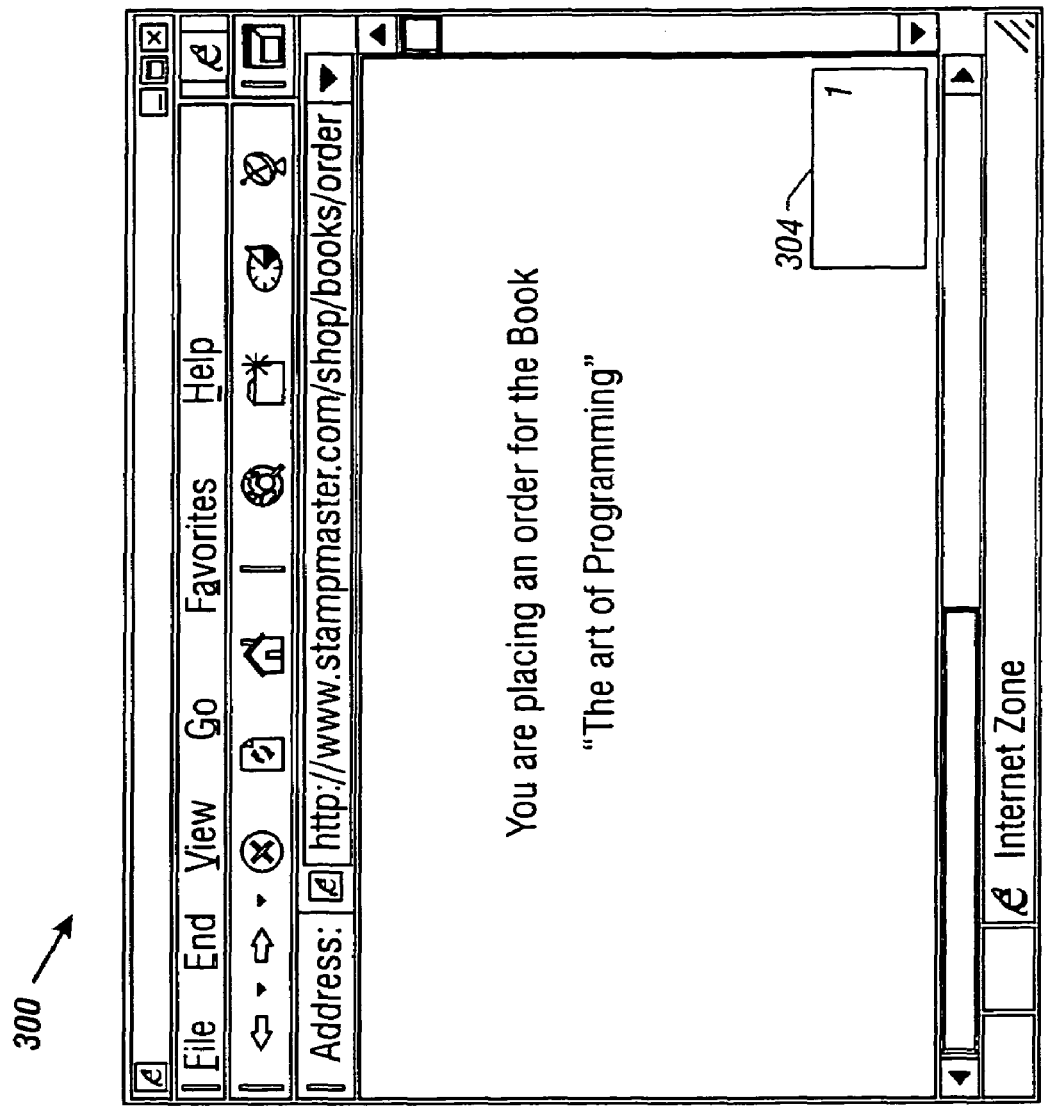
Figure 6:
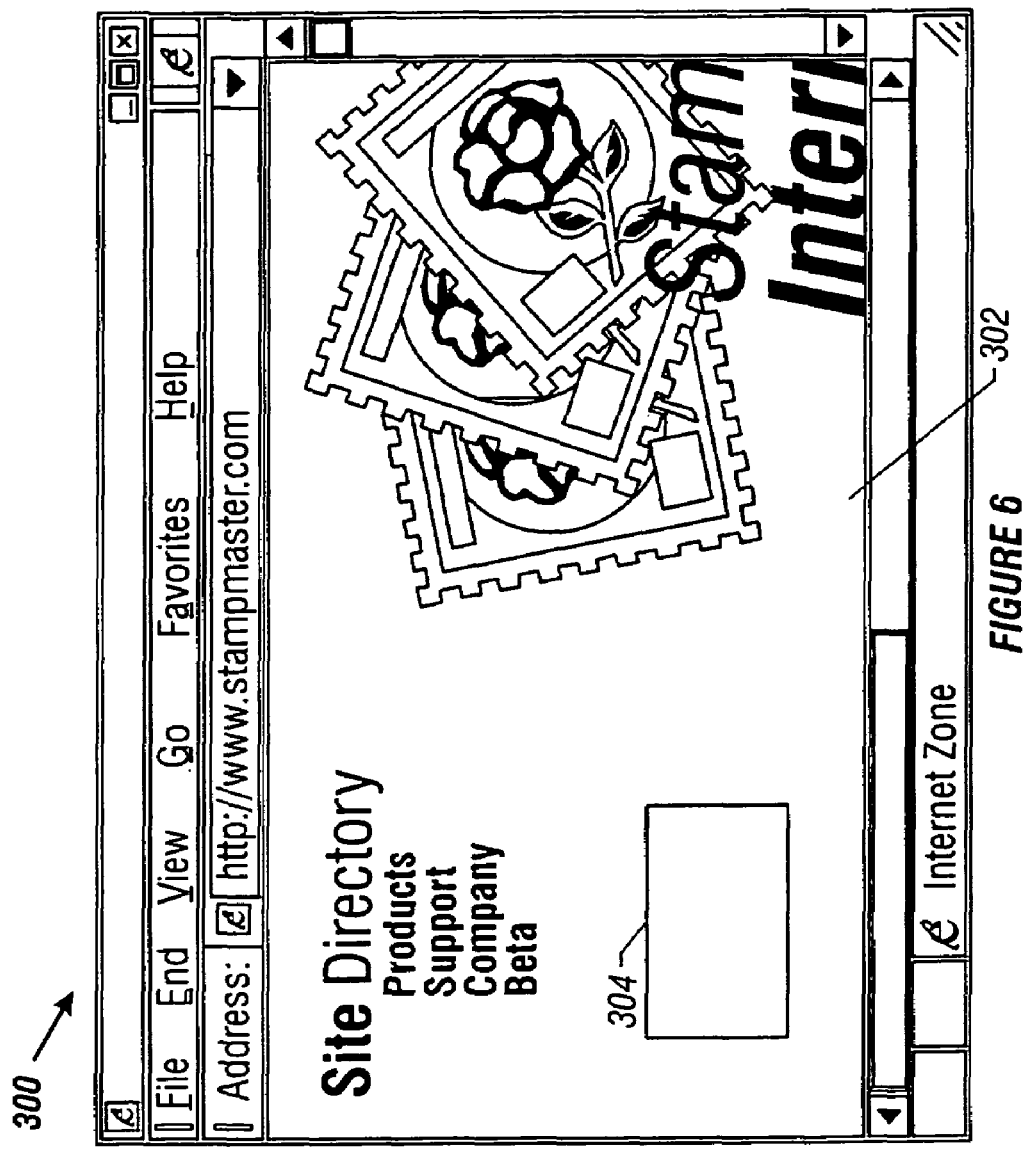

As shown in FIG. 3, the users click on the merchant icons 304 on the vendor home page 302, and as shown in FIG. 4 the merchant web pages 306 at server 131 are displayed on browser 300 which resides at client computer 101 via server 130. The user searches/chooses the items 308 to buy from the merchant web page 306. As shown in FIG. 5, the user places the order for the selected items that he/she wants to buy. The vendor places the order to the respective merchant. The user will not have to register with the merchant for this purpose, as the order will be placed by the vendor on behalf of the user. As shown in FIG. 6, the user is once again taken back to the vendor's home page 302.

Figure 7:
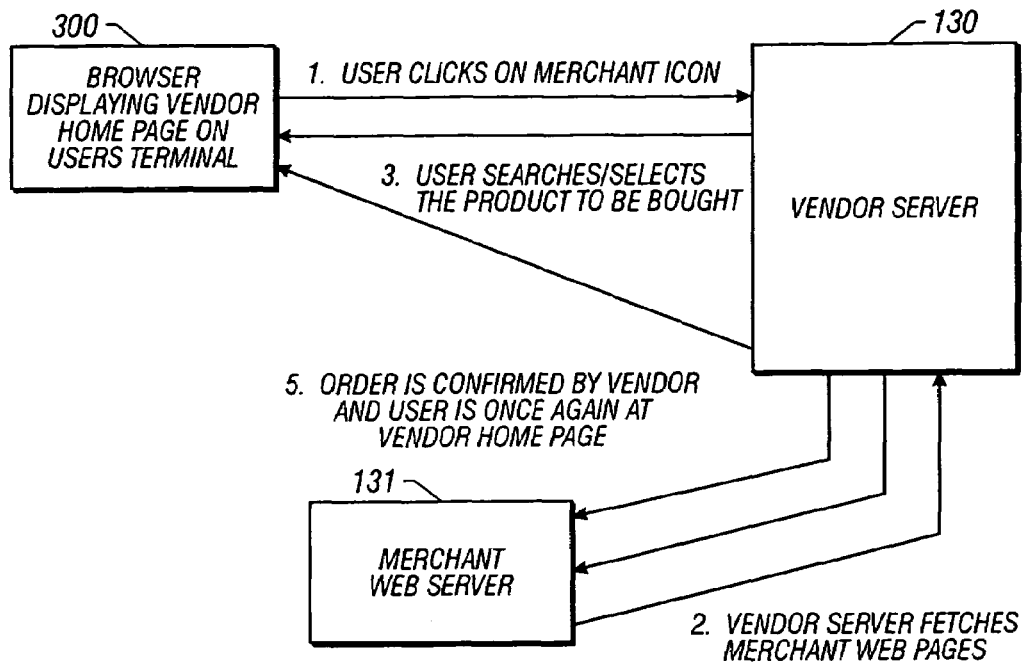
FIG. 7 is a block diagram that illustrates how one embodiment of the invention interacts with a user browser on a client computer, a vendor computer system and merchant computer system.

Referring to FIGS. 7-10, example functional/architectural block diagrams for system/software enabling the above process is described. As shown in FIG. 7, vendor computer system 130 captures the information traffic between a merchant site at server 131 and user browser 300 at the client computer 101 via vendor computer system 130. The traffic is routed through vendor computer system 140 for control over the user actions. Server 130 acts as a proxy between the user client computer 101 and the merchant server 131. As such, the user first clicks on the merchant icon on the GUI displayed on browser 300 at the client computer 101 by the vendor's web server 130. Server 130 fetches the merchant's web pages from the server 131 for display to the user on client computer 101. The user searches/selects desired products for purchase from the displayed merchant web pages. Server 130 then places orders for the selected products to the merchant server 131 on behalf of the user. The order is confirmed by the server 130 the vendor web site/pages are again displayed to the user on the client computer 101 for additional user interaction.

Figure 8:
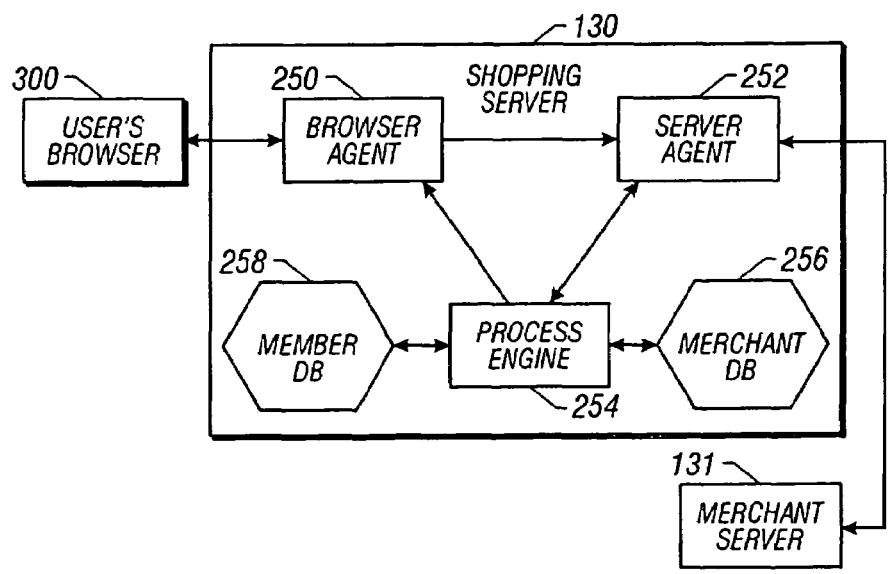
FIG. 8 is a block diagram that illustrates how a vendor computer system may be implemented by one embodiment of the invention.

Referring to FIG. 8, in one embodiment the server 130 comprises HTTP server component capable of handling traffic between the users browser at the client computers 101 and the respective merchants' sites at the server 131 via the server 130. Server 130 may comprise the following modules: (1) Browser Agent 250, (2) Server Agent 252, (3) Process Engine 254, (4) Merchant Data Base (DB) 256, and (5) Member Data Base (DB) 258. FIG. 8 shows example interaction between these modules.

The Browser Agent 250 module comprises HTTP compliant listener at the server 130 waiting for HTTP requests from the user's browser at the client computer 101. The Browser Agent 250 receives HTTP requests from the user's browser 300 and forwards them to the Server Agent 252 for processing and thereafter forwards the processed response from the Process Engine 254 back to the user's browser 300.

The Server Agent module 252 forwards the HTTP requests from the Browser Agent 250 to the merchant's site at the server 131. The Server Agent 252 processes all responses from the merchant HTTP server 131. The response from the merchant server 131 is passed back to the Process Engine 254 by the Server Agent 252.

Figure 9:
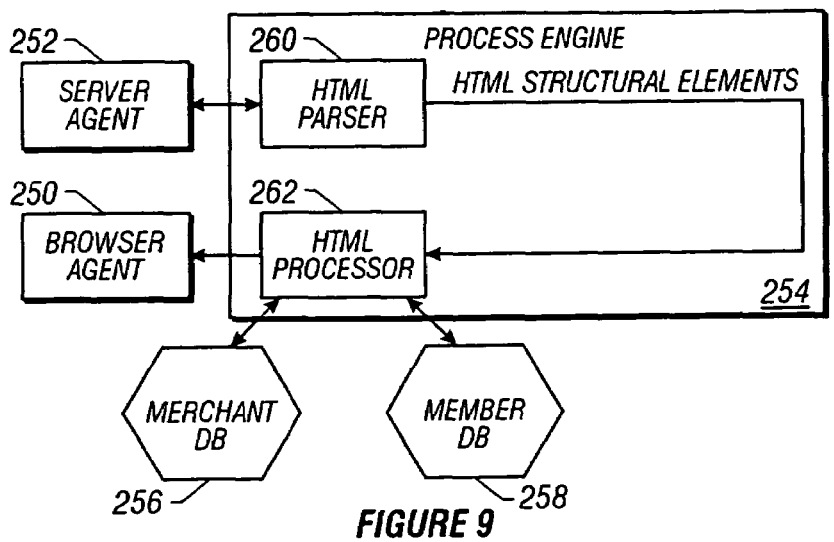
FIG. 9 is a block diagram that illustrates the process engine utilized in the vendor computer system by one embodiment of the invention.

Referring to FIG. 9, in one embodiment of the invention, the Process Engine 254 includes an HTML Parser module 260 and HTML Processor module 262. The Process Engine 254 receives the HTTP responses form the Server Agent 252, processes them and sends the processed response back to the Browser Agent 250 to be forwarded to the User's browser 300. The HTML Parser 260 parses the HTML response/page (generated by the server 131) from the Server Agent 252 and breaks it into different atomic units link HyperLinks, Actions, ImageLinks, etc. The HTML Parser 260 splits the page into a structure with the different elements of the HTML page. The HTML Processor 262 includes a search/replace module which scans all HTML Parser generated structural elements, and makes necessary modifications to the elements. The HTML Processor 262 then re-constitutes the HTML page with the new changes and forwards the new page to the Browser Agent 250. In the process of making said modifications, the HTML Processor 262 also interacts with the MerchantDB 256 and Member/user DB 258.

The MerchantDB 256 comprises detailed information about the Merchants' web sites such as Merchant Name, Merchant Start Page URL, Merchant Shopping Page URL, Cookie information, etc. The Process Engine 254 interacts with the MerchantDB 256 to access said merchant specific information for processing the HTML responses from the merchant server 131. The MemberDB 258 comprises details about various users, such as User's name, address, billing address, shipping address, Credit Card details, etc. This information is accessed by the Process Engine 254 near the end of the shopping process, i.e., while vendor places orders to the merchants.

In a conventional HTTP transaction, the user's browser 300 at the client computer 101 sends a request for a page directly to a merchant server 131 and the merchant server 131 responds to the browser request by either sending the requested page back to the browser 300 at the client computer 101 or performing an appropriate action requested by the browser. According to an embodiment of the present invention, however, all the traffic between the user's browser 300 at the client computer 101 and merchant's server 131 is routed through the vendor computer system 130.

The following includes example steps in processing a single HTTP request:
1. User's browser 300 at the client computer 101 sends an HTTP request to the BrowserAgent 250 at the server 130;
2. The Browser Agent 250 forwards the request to the ServerAgent 252;
3. The ServerAgent 252 sends the request to a merchant's server 131;
4. The merchant's server 131 sends an HTML response (HTML page) to the ServerAgent 252;
5. The HTML response from the merchants server 131 is sent to the Process Engine 254;
6. The Process Engine 254 processes the HTML response by performing steps including:
   6.1. Parsing the HTML response;
   6.2. Replacing all the HTML links on the HTML page so that the links are routed through the vendor computer system 130;
   6.3 Replacing all the HTML POST, GET requests to be routed through the vendor computer system 130;
   6.4 Using the information available in the MerchantDB 256 and making appropriate changes to the HTML;
   6.5. Using the information available in the MemberDB 258, automating the process of placing an order, registering a user (member) with a merchant, etc.;
7. The process Engine 254 then sends the modified HTML response back to the Browser Agent 250; and
8. The Browser Agent 250 sends the modified HTML response back to the User's Browser 300 for display to the user at the client computer 101.

Figure 10:
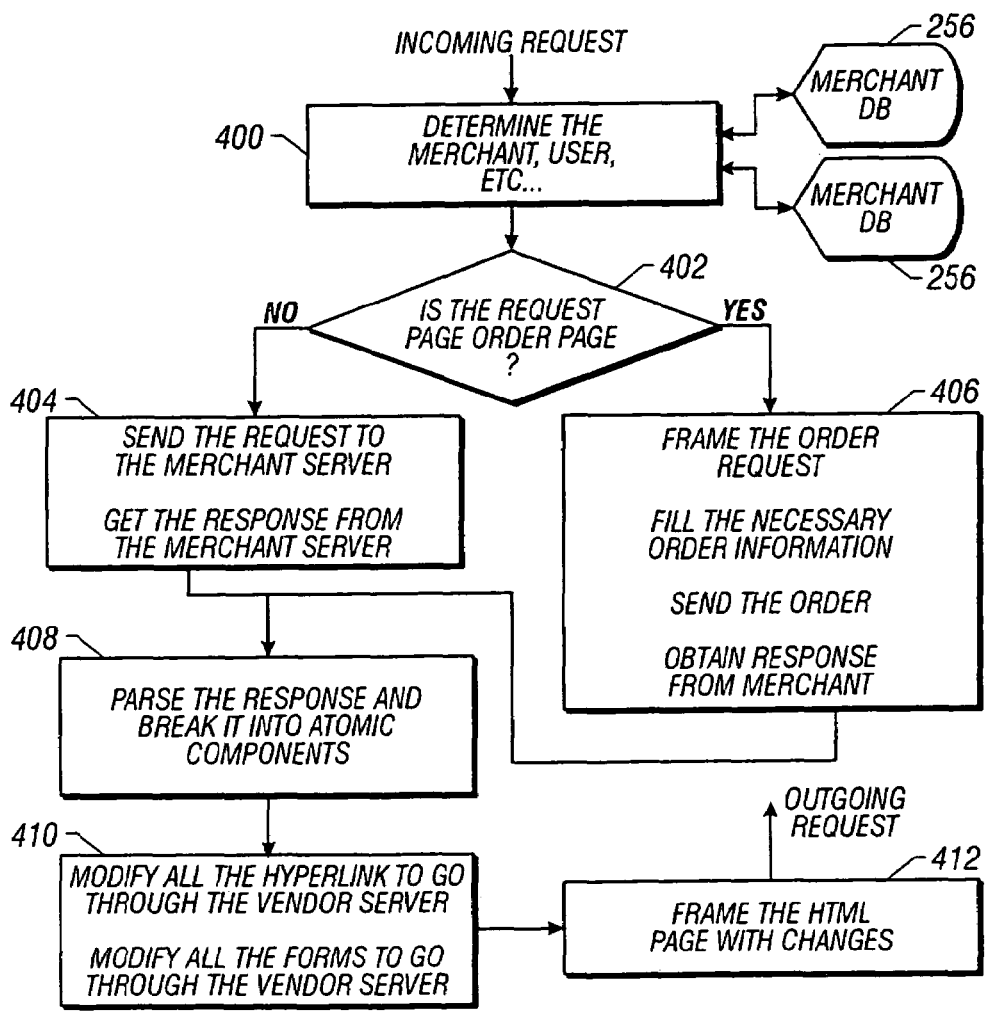
FIG. 10 illustrates the steps performed by the process engine in one embodiment of the invention.

FIG. 10 provides an example flowchart that illustrates for the operation of the Process Engine 254. Upon receiving an incoming request from a user browser 300, the process engine 254 determines the user, merchant, etc. in the request (step 400). The process engine 254 then determines if the request is a purchase order (step 402). If not, the process engine 254 sends the request to the server 131 of the merchant specified in the request, and receives a response from the merchant server 131 (step 404). If in step 402, the request was a purchase order, the process engine frames the order request, fills in the necessary information from the merchant and member data bases, send the order to the merchant server 131, and obtains a response from the merchant server 131 (step 406).

In either steps 404 or 406, upon receiving response from the merchant server 131, the process engine 254 parses the response and breaks it into atomic components as described above (step 408). The process engine 254 modifies all hyperlinks in the response HTML page to be routed to the vendor computer system 130, and modifies all the forms to be routed to the vendor computer system 130 (step 410). The process engine 254 then frames the HTML response page with the changes to be sent to the user's browser 300 (step 412).

The 130 server can have different embodiments including a standalone server, or an add-in to a standard web server. In the latter case, the server 140 can comprise a CGI program, a ISAPI component, a servlet, etc.

Although the present invention has been described in considerable detail with regard to the preferred versions thereof, other versions are possible. Therefore, the appended claims should not be limited to the descriptions of the preferred versions contained herein.

What is claimed is:

1. A method for providing secure, indirect electronic commerce transactions between a user and multiple merchants comprising:
    establishing a secure communication link between at least one client computer system and a vendor computer system;
    transmitting transaction information to said client computer system from said vendor computer system enabling a user at said client computer system to select for purchase, via said vendor computer system, items listed in a plurality of merchant computer systems without said user having direct access to said merchant computer systems;
    receiving at said vendor computer system a first request from a client computer system concerning an item listed on a first of said merchant computer systems;
    modifying at said vendor computer system said first request from said client computer system to said vendor computer system into a modified request from said vendor computer system to said merchant computer system;
    sending said modified request from said vendor computer system to said merchant computer system;
    receiving at said vendor computer system from said first merchant computer system a first response to said modified request, said first response comprising a merchant web page comprising one or more hyper-text links to said merchant computer system;
modifying said merchant web page at said vendor computer system into a modified web page;
wherein said modifying said merchant web page comprises:
replacing said one or more hyper-text links to said merchant computer system in said merchant web page with one or more hyper-text links to said vendor computer system in said modified web page; and
sending said modified web page from said vendor computer system to said client computer system.

2. The method of claim 1, wherein said transmitting step further comprises:
generating a purchase order for said item after said user's selection of said item for purchase via said vendor computer system.

3. The method of claim 2, further comprising: obtaining payment from said user; and
transmitting payment to said first merchant on behalf of said user.

4. The method of claim 3, wherein said payment is obtained by an operator of said vendor computer system.

5. The method of claim 1, wherein said step of transmitting transaction information further comprises:
displaying one or more icons corresponding to said plurality of merchants at said client computer for user selection;
providing a listing of said items listed in said merchant computer system to said user at said client system computer via said vendor computer system, in response to said user selection of at least one of said one or more icons.

6. A method for performing secure, indirect electronic commerce between a user and multiple merchants comprising:
establishing a secure communication link between a client computer system and a vendor computer system;
transmitting transaction information to said client computer system from said vendor computer system enabling a user at said client computer system to obtain, via said vendor computer system, items listed in a plurality of merchant computer systems by one or more merchants without said user having direct access to said merchant computer systems;
monitoring at said vendor computer system requests from said client computer system for information regarding at least one of said listed items;
requesting by said vendor computer system transaction information regarding said at least one of said listed items from at least one of said merchant computer systems;
modifying at said vendor computer system a response comprising a merchant web page regarding said at least one of said listed items received by said vendor computer system from said at least one of said merchant computer systems;
wherein said modifying said response comprises:
modifying said merchant web page into a modified web page by replacing one or more hyper-text elements in said merchant web page comprising links to said at least one of said merchant computer systems with one or more hyper-text elements comprising links to said vendor computer system in said modified web page; and
sending said modified web page from said vendor computer system to said client computer for display to said user.

7. The method of claim 6, further comprising: generating a purchase order for said at least one of said listed items.

8. The method of claim 7, wherein said vendor computer system forwards payment to said at least one of said merchant computer systems for said at least one of said listed items on behalf of said user.

9. The method of claim 8, wherein said user makes payment to said vendor for said at least one of said listed items.

10. The method of claim 6, further comprising:
displaying a merchant icon associated with at least one of said one or more merchants at said client computer system for selection by said user; and
in response to said selection by said user of said merchant icon, providing a list of items from at least one of said plurality of merchant computer systems to said user at said client computer system via said vendor computer system.

11. The method of claim 1, wherein said step of modifying said merchant web page occurs automatically.

12. The method of claim 6, wherein said step of modifying responses occurs automatically.

13. A vendor computer system having computer readable program code embodied therein for implementing a vendor server to enable secure, indirect electronic commerce between a user at a client computer system and one or more merchant servers, said program code configured to perform at least the steps of:
establishing a secure communication link between a client computer system and a vendor server;
transmitting transaction information to said client computer system from said vendor server enabling a user at said client computer system to select for purchase, via said vendor server, items listed in a plurality of merchant servers without said user having direct access to said merchant servers;
receiving at said vendor server a first request from a client computer system concerning an item listed on a first of said merchant servers;
modifying at said vendor server said first request from said client computer system to said vendor server into a modified request from said vendor server to said merchant server;
sending said modified request from said vendor server to said merchant server;
obtaining by said vendor server merchant content comprising a merchant web page for items listed for sale from said merchant server;
modifying said merchant web page at said vendor server into a modified web page by replacing hyper-text links to said merchant server in said merchant web page with hyper-text links to said vendor server in said modified web page;
sending said modified web page from said vendor server to said client computer system for presentation to said user.

14. The vendor computer system of claim 13, wherein said step of obtaining said merchant content comprises:
receiving at said vendor server a user request from said client computer system;
modifying at said vendor server said user request into a vendor request to said merchant server;
transmitting said vendor request from said vendor server to said merchant server; and receiving at said vendor server from said merchant server a response comprising said merchant content.

15. The vendor computer system of claim 14, wherein said step of receiving said user request at said vendor server comprises receiving information for identifying said merchant server from a plurality of possible merchant servers.

16. The vendor computer system of claim 14, wherein said user request is an order request, and said step of modifying said user request into a vendor request to said merchant server comprises inserting vendor information into said order request.

17. The vendor computer system of claim 14, wherein said user request is one of:
- a search request;
- an order request; and
- a selection request.

18. A secure electronic commerce system, comprising:
- means for establishing a secure communication link between a client computer system and a vendor server;
- means for transmitting transaction information to said client computer system from said vendor server enabling a user at said client computer system to select for purchase, via said vendor server, items listed in a plurality of merchant servers without said user having direct access to said merchant servers;
- means for receiving at said vendor server a first request from a client computer system concerning an item listed on a first of said merchant servers;
- means for modifying at said vendor server said first request from said client computer system to said vendor server into a modified request from said vendor server to said merchant server;
- means for sending said modified request from said vendor server to said merchant server;
- means for obtaining merchant content comprising a merchant web page from said merchant server;
- means for facilitating the purchase by a user at said client computer system of items from said merchant server comprising:
  - means at said vendor server for creating a modified web page by replacing hyperlinks to said merchant server in said merchant web page with hyperlinks to said vendor server in said modified web page; and
  - means for sending said modified web page from said vendor server to said client computer system for presentation to said user.

* * * * *